(12) United States Patent
Kudo et al.

(10) Patent No.: US 6,899,473 B2
(45) Date of Patent: May 31, 2005

(54) FOCAL PLANE SHUTTER FOR CAMERAS

(75) Inventors: Kouichi Kudo, Tokyo-to (JP); Nobuyoshi Inoue, Kawagoe (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/786,599

(22) Filed: Feb. 26, 2004

(65) Prior Publication Data

US 2004/0170423 A1 Sep. 2, 2004

(30) Foreign Application Priority Data

Feb. 28, 2003 (JP) ........................................ 2003-053583

(51) Int. Cl.[7] ................................................ G03B 9/40
(52) U.S. Cl. ...................................... 396/484; 396/456
(58) Field of Search ................................ 396/357, 456, 396/484, 486, 487, 488, 489, 490; 348/362

(56) References Cited

U.S. PATENT DOCUMENTS 5,664,247 A * 9/1997 Hasuda et al. ............... 396/456

FOREIGN PATENT DOCUMENTS

| JP | 58-196527 | 11/1983 |
|---|---|---|
| JP | 1-304437 | 12/1989 |
| JP | 9-236845 | 9/1997 |
| JP | 10-221744 | 8/1998 |
| JP | 2001-188280 | 7/2001 |

* cited by examiner

*Primary Examiner*—Judy Nguyen
*Assistant Examiner*—Arthur A Smith
(74) *Attorney, Agent, or Firm*—Pillsbury Winthrop LLP

(57) ABSTRACT

A focal plane shutter for cameras is provided with a shutter blade which can be actuated to both directions for opening and for closing a photographing optical path by an electromagnetic apparatus. When a rotor is rotated to the direction corresponding to the direction of conduction of coils an actuating member which is formed in one with the rotor make arms rotate by its actuating pin and actuates four blades of the shutter blade about upward and downward direction. A brake member rotatably arranged together with on a friction plate on a shaft has bent portions formed near tip portions of the arm portions which are inserted in a slot on a shutter base plate. An operation for opening the shutter blade is braked by the actuating pin contacting, pressing and moving one of the bent portions at termination stage, and a closing operation is braked by the actuating pin contacting, pressing and moving another bent portion at the termination stage. Thus the shutter blade can be braked suitably at the termination stage and stopped early.

6 Claims, 8 Drawing Sheets

FOCAL PLANE SHUTTER FOR CAMERAS

BACKGROUND OF THE INVENTION

1. Field of the Invention

The present invention relates to a focal plane shutter for cameras having a shutter blade which can be actuated in both directions for opening as well as closing an opening of a photographing path by an electromagnetic actuating device, such as a motor.

2. Description of the Related Art

In a focal plane shutter for cameras, there are two types of focal plane shutter. One type is equipped with two shutter blades and another type has only one shutter blade. The former type having two shutter blades has been adopted to silver-salt film cameras as well as digital still cameras, while the latter having single shutter blade has been adopted only to digital still cameras. As an actuating source for operation of a shutter blade at the time of photographing, a coil spring has been generally used and it has been also proposed for many years that an electromagnetic device such as a motor is used.

It is known that when these shutter blades are respectively driven by actuating source of each electromagnetic device in case of a focal plane shutter equipped with two shutter blades as mentioned above, there is one type of focal plane shutter, wherein in reciprocating motion of two shutter blades forward motion is adopted for exposure and return motion is used for cocking.

On the other hand, in another type, both of the forward motion and the return motion in the reciprocating motions are used for exposure, but cocking is not executed. (i.e. Japanese Patent Application Publication: Toku Kai No.2001-188280). Furthermore, it is also known that in a focal plane shutter with only one shutter blade, such shutter blade is driven in the reciprocating motion using an electromagnetic actuating device as a source of driving. (refer to Japanese Patent Application Publication Toku Kai No.2001-188280)

It is required that a shutter blade should operate at high speed at the time of photographing. However, such shutter blade may be bounded or broken by the shock of the bound of a shutter blade when the shutter blade itself or the driving member operating the shutter blade is collided with a stopper for stopping the action of the shutter. When the bound is big, it may cause generation of exposure unevenness in case of a focal plane shutter with two shatter blades, while it may cause exposure unevenness and the smear phenomenon in case of a focal plane shutter with one shatter blade (for digital camera). Then, it is known that in case of a focal plane shutter using spring as an actuating source, a brake means is provided in order to brake action of the actuating member and the shutter blades at the termination stage of an exposure operation (refer to ,for example, Japanese Patent Application Publication: Toku Kai Hei No. 10-221744)

Providing the brake means mentioned above is also needed when a shutter blade is actuated by an electromagnetic device as an actuating source. It is because recently it has become possible to actuate a shutter blade at remarkably high speed, since the performance of a motor has been improved as well as weight reduction of a shutter blade has also progressed and so on. Accordingly, in a focal plane shutter with two shutter blades in which both of the forward motion and the return motion in the reciprocating motion are used for exposure, a brake means at the time of actuation in the forward motion and another brake means at the time of actuation of the return motion are necessary. Furthermore, recently, the demand for continuous photographing function is strong and it is required that time interval for starting the next photographing is shortened as much as possible. Therefore, a brake means at the time of the return motion and the brake means at the time of the forward motion are also needed when an exposure operation is performed only by the forward motion, while a cocking actuation is carried out by the return motion in order to carry out a cocking actuation at high speed and to acquire a stabilized cocking state quickly. Furthermore, in order to cope with the demand of shortening time interval necessary for starting the next photographing, the brake means at the time of the forward motion and the brake means at the time of return motion are needed, even in a shutter having only one shutter blade.

As mentioned above, in case that both brake means in the forward motion and in the return motion are needed, arranging each brake means individually causes increase of the number of parts. This is not only disadvantageous from viewpoint of cost but also very difficult to arrange a lot of parts in narrow space of the shutter base plate. Also, if each part is made small to make an arrangement in narrow space possible, an assembly work becomes difficult and a predetermined function cannot be actually obtained. Furthermore, it is necessary to device a certain proper means for the constitution as well as the layout of the brake means, the electromagnetic actuating device which occupies a relatively big space and the actuating member driving a shutter blade where the electromagnetic actuating device as an actuating source. Otherwise, the space occupied with such mechanism portion becomes large and consequently it causes large sizing of shutter unit.

SUMMARY OF THE INVENTION

The purpose of the present invention is to solve the above mentioned problems and to provide a focal plane shutter for cameras with compact constitution which is advantageous in cost and the space. The focal plane shutter for cameras according to the present invention is provided with at least one shutter blade which is driven in reciprocating motion by an electromagnetic actuating device as an actuating source whereby a stabilized stop state of a shutter is quickly obtained by proper braking at the termination stage in the forward motion as well as in the return motion of the shutter blade.

In order to achieve purposes mentioned above, the focal plane shutter for cameras according to the present invention comprises a shutter base plate having a first opening for a photographing path, an auxiliary base member which has a second opening to regulate an opening for the photographing optical path by at least one of the first opening and the shutter base plate, and constitutes a blade chamber between the shutter base plate and the auxiliary base member, a shutter blade which is constituted by a plurality of arms arranged in the blade chamber and pivoted on the shutter base plate, and at least one blade pivoted respectively on each arm, an actuating member which is rotatably arranged on the shutter blade and is connected with the shutter blade, and actuates the shutter blade by its reciprocating rotation to move between a fully opened position and a completely closed position of the opening for the photographing optical path, an electromagnetic actuating device which is arranged on the shutter base plate and carries out the reciprocating rotation of the actuating member, a brake member which is rotatably arranged on the shutter base plate, and has two pressed portions which are contacted, pressed and moved by the actuating member at each termination stage of the reciprocating rotation of the actuating member, and a brake means which brakes rotation of the brake member by friction power generated by contacting under pressure with the brake member.

According to the present invention, two blade chambers are formed by partitioning space between the shutter base plate and the auxiliary base member, and a shutter blade is arranged in one of the blade chambers and another shutter blade is arranged in another blade chamber, and for said another shutter blade respective constituting means which is corresponding to the actuating member, the electromagnetic actuating device, the brake member and the brake means is individually arranged.

According to the present invention, the electromagnetic actuating device has a rotor made of permanent magnet, the actuating member has a driving pin connected to the shutter blade and the rotor is constituted to one with the actuating member. This is advantageous in cost saving since constituting members can be reduced.

According to the present invention, a rotation shaft of the rotor is pivoted perpendicularly to the shutter base plate, the brake member has V-shape which is formed by two arm portions extending from attachment portion to the shutter base plate, the rotation shaft is arranged between the arm portions, the pressed portions are formed near the tip of the two arm portions, the brake means is a friction plate mounted in piles on the attachment portion and the driving pin of the brake member is constituted to contact, press and move the pressed portions. Thus, very compact focal plane shutter as a whole can be provided.

According to the present invention, in a focal plane shutter for cameras having at least one shutter blade which is driven in reciprocating motion by an electromagnetic actuating device such as a motor etc. as an actuating source, a stabilized stop state of a shutter can be quickly obtained by properly braking at the termination stage in the forward motion and in the return motion of the blade. Thus, by the constitution mentioned above it is possible to suppress generation of exposure uneveness and the smear phenomenon, and the next photographing can be quickly started.

Furthermore, according to the present invention, the one brake member is constituted to perform brakes by frictional resistance force at the actuation in the forward motion as well as in the return motion of the shutter blade. Accordingly, a focal plane shutter which is more compact and advantageous in cost with a small number of parts can be used.

This and other objects as well as the features and the advantages of the present invention will become apparent from the detailed description of the preferred embodiments when taken in conjunction with the accompanying drawings.

DETAILED DESCRIPTION ON THE PREFERRED EMBODIMENTS

Figure 1:
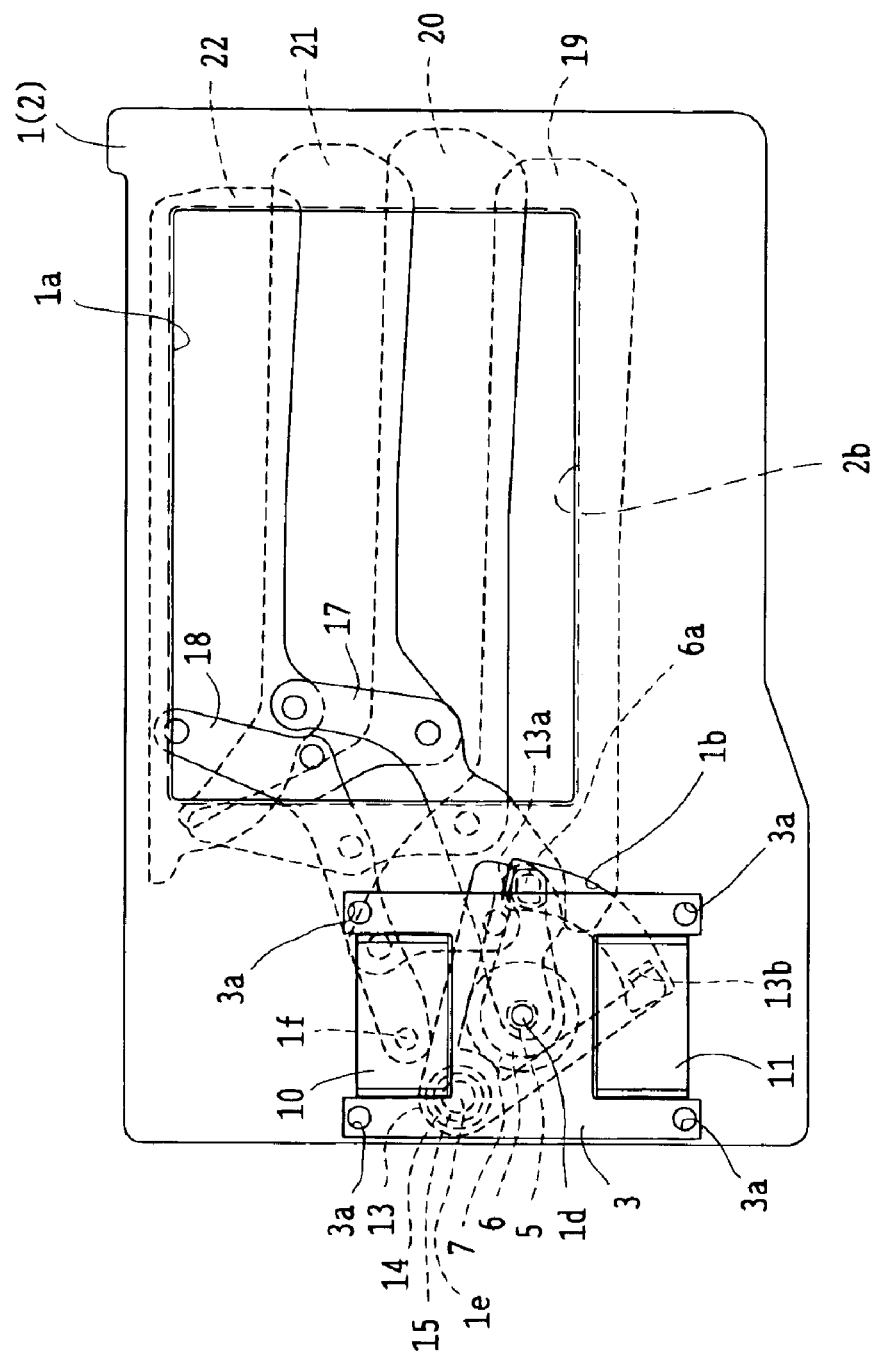
FIG. 1 is a plane view of the first embodiment of a focal plane shutter according to the present invention which is in an initial state where photographing has not yet been carried out.
Figure 2:
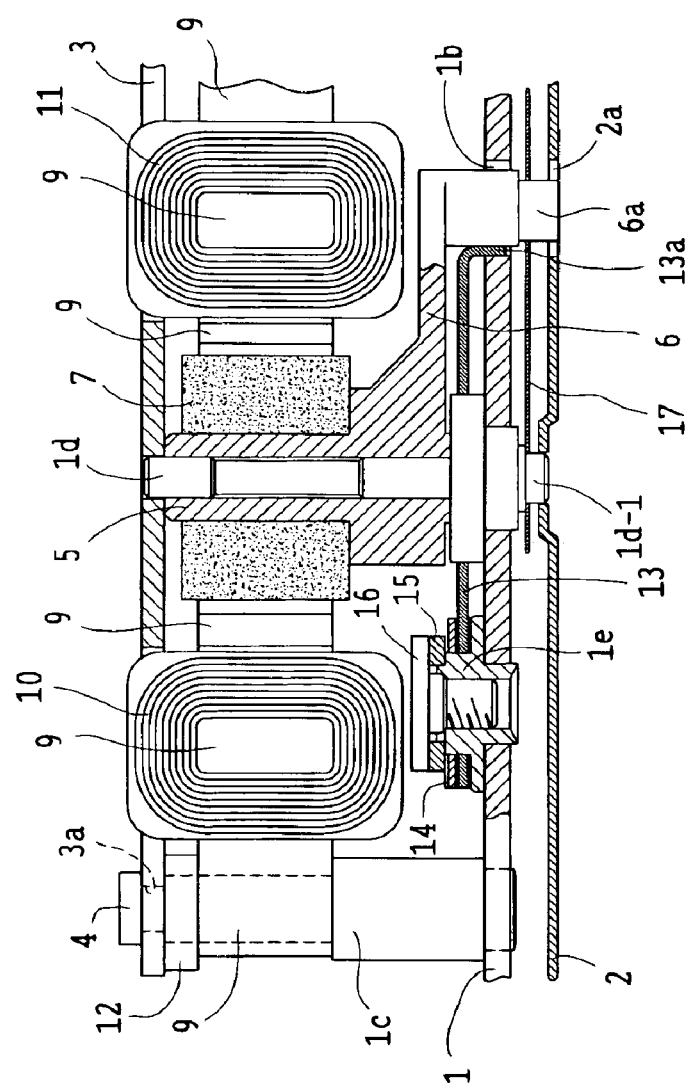
FIG. 2 is a sectional view of a main portion shown in FIG. 1.
Figure 3:
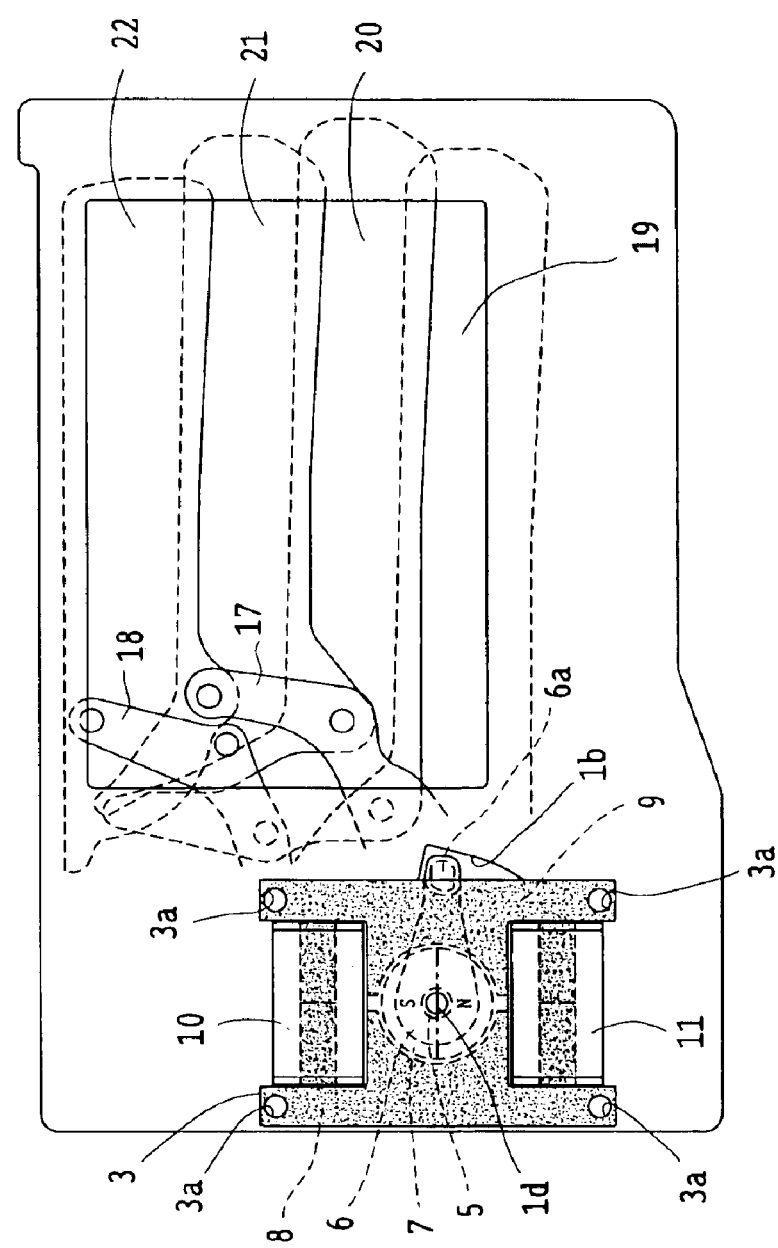
FIG. 3 is a plane view for explaining easily the constitution of an actuating mechanism at the state shown in FIG. 1.
Figure 4:
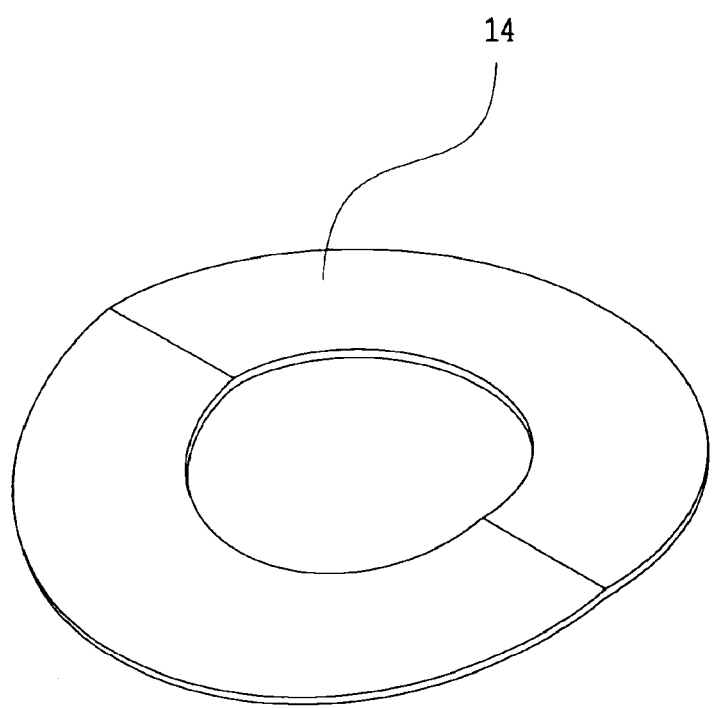
FIG. 4 is a perspective view showing a shape of a friction plate shown in FIG. 2.
Figure 5:
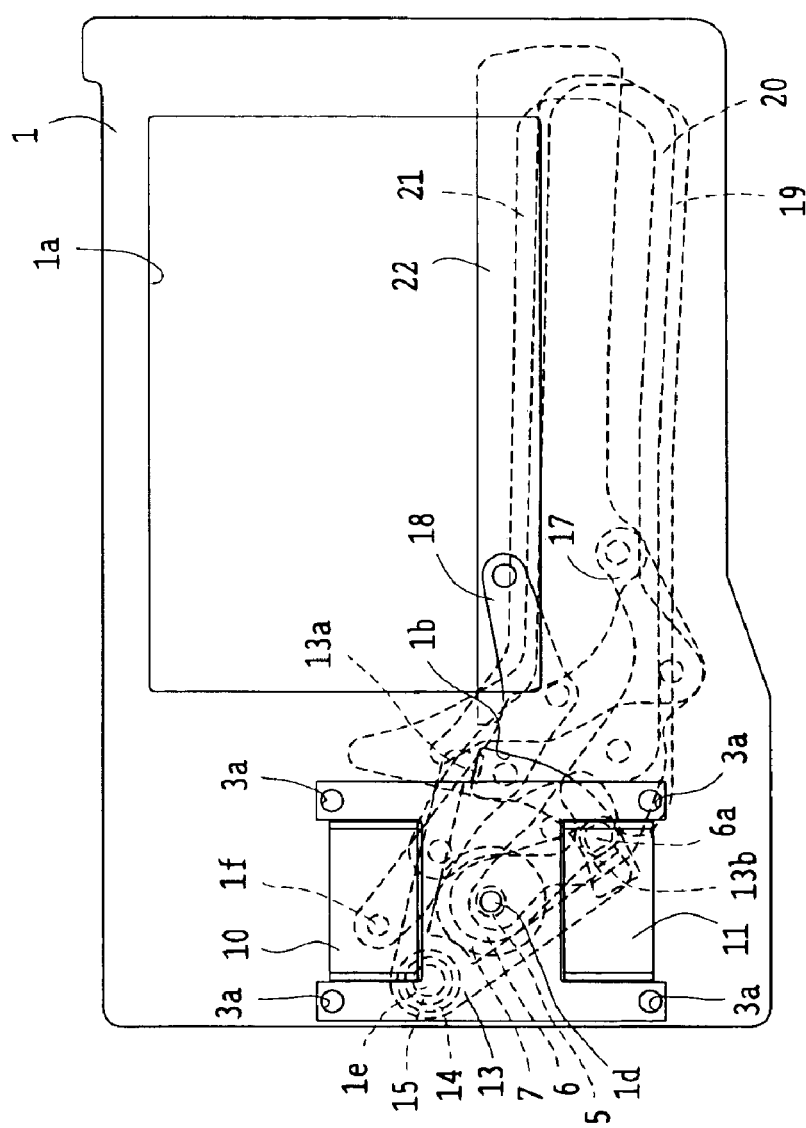
FIG. 5 is a plane view showing an intermediate state where a shutter blade after having released is operating toward a starting position for photographing from the state shown in FIG. 1.
Figure 6:
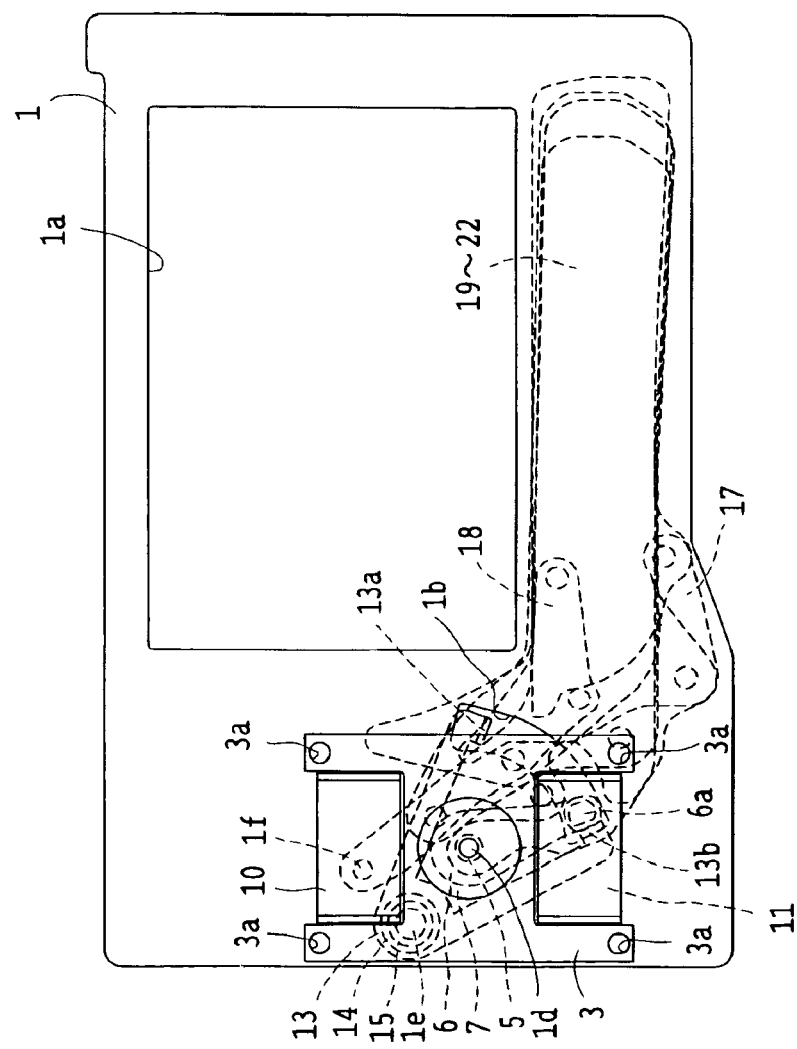
FIG. 6 is a plane view showing a state where a shutter blade has stopped after having been actuated to a starting position for photographing from the state shown in FIG. 1.

FIG. 1 to FIG. 6 are for explaining the first embodiments of the present invention. FIG. 1 is a plane view showing an initial state where photographing has not yet been carried out. FIG. 2 is a sectional view of a main portion shown in FIG. 1. FIG. 3 is a plane view for explaining easily the constitution of an actuating mechanism at the state shown in FIG. 1 and FIG. 4 is a perspective view showing a shape of a friction plate shown in FIG. 2. FIG. 5 is a plane view showing an intermediate state where a shutter blade after having released is operating toward a starting position for photographing from the state shown in FIG. 1 and FIG. 6 is a plane view showing a state where a shutter blade has stopped after having been actuated to a starting position for photographing from the state shown in FIG. 1.

Figure 7:
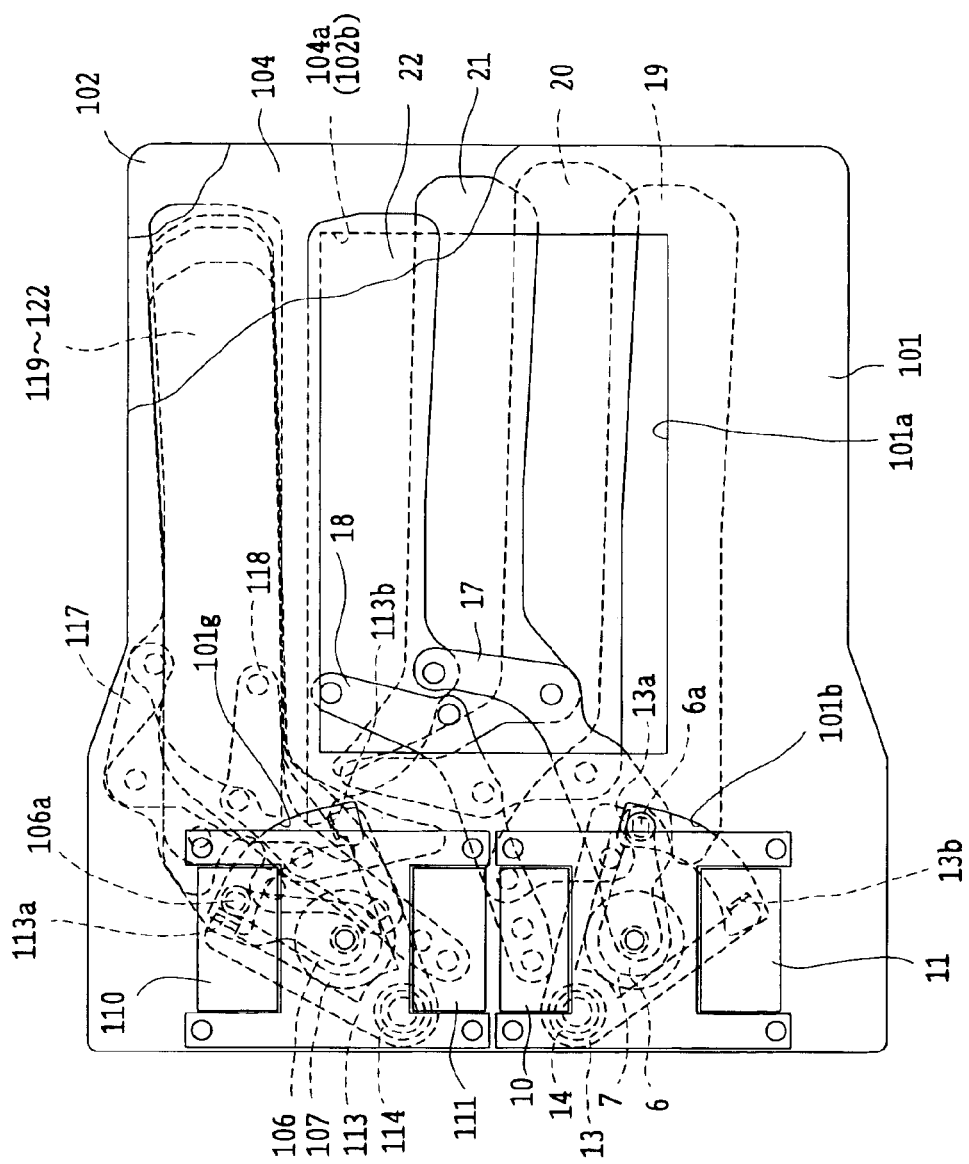
FIG. 7 is a plane view showing a state where photographing has not yet started in the second embodiment of a focal plane shutter according to the present invention.
Figure 8:
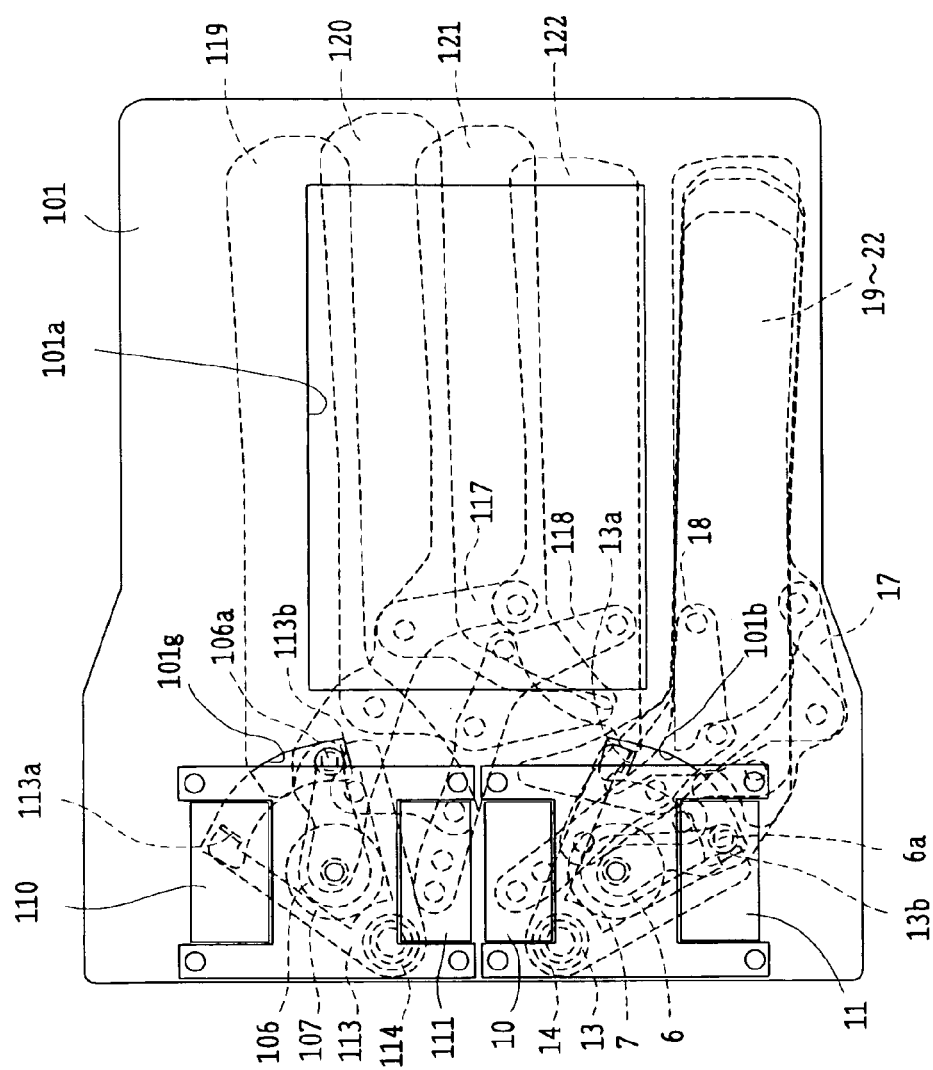
FIG. 8 is a plane view showing a state where photographing has been carried out from the state shown in FIG. 7 and an actuation of a shutter blade has been finished.

FIGS. 7 and 8 are for explaining the second embodiment of the present invention. FIG. 7 is a plane view showing a state where a photographing has not yet started and FIG. 8 is a plane view showing a state where photographing has been carried out from the state shown in FIG. 7 and the actuation of shutter blades has been finished.

First Embodiment

Since this embodiment relates to a focal plane shutter equipped with only one shutter blade, it is not adopted in silver-salt film cameras, but is adopted only in digital still cameras. Meanwhile, it is well known that there are control systems in digital still cameras. One of the control systems is called the normally-closed system where a shutter blade closes an opening for photographing optical path except when taking a photograph, and another control system is called the normally-open system in which the opening for photographing optical path is fully opened even while not taking a photograph. At present, in digital still cameras equipped with a focal plane shutter, the normally-closed system is usually adopted. Therefore, explanation of the operation of this embodiment will be mainly given to the case of a normally-closed system.

In FIG. 1, an opening 1a for photographing optical path having rectangle laterally elongated shape is formed in a shutter base plate 1. As shown in FIG. 2, at a predetermined space, an auxiliary base member 2 is attached at the back side of the shutter base plate 1, and a blade chamber is constituted among them. Although not shown in detail, the auxiliary base member 2 has a plane shape similar to that of the shutter base plate 1 and an opening similar to the shape of the opening 1a in an area superposing the opening 1a. However, in this embodiment, the opening for photographing optical path is restricted by the opening 1a since the opening formed in the auxiliary base member 2 is a little larger than the opening 1a of the shutter base plate 1.

As shown in FIG. 1 an arc-shaped slot 1b is formed in the area on the left-hand side of the opening 1a. And a similar shaped slot 2a (refer to FIG. 2) is formed on the auxiliary base member 2 at the portion superposed to the slot 1b. Shafts 1c are arranged to stand at four places on the shutter base plate 1, and an attachment plate 3 is attached at the tip of shafts by four pieces of screw 4. However, such shafts 1c and screw 4 are illustrated about only one place in FIG. 2 but are not shown in FIG. 1. Four holes 3a for attachment to such shafts 1c are formed on the attachment plate 3 but the screws 4 are omitted in order to illustrate clearly such holes 3a in FIG. 1.

Next, the actuating mechanism arranged between the shutter base plate 1 and the attachment plate 3 is explained. The actuating mechanism of this embodiment consists of an actuating member which operates a shutter blade, and a current control type motor which rotates the actuating member which is manufactured in one with the rotor of the motor by molding processing. Then, at first, the integrated constitution and its support constitution are explained. As shown FIG. 2, a shaft 1d is attached in the shutter base plate 1, and the tip of it is made to fit into a hole formed in the attachment plate 3. The shaft Id has also shaft part 1d-1 from the attachment part for the shutter base plate 1 to the blade chamber side.

The constituted body of the rotor of the motor and the actuating member mentioned above has a cylindrical body 5 which is rotatably engaged in the shaft id and the actuating member 6 which is formed by extending in radial direction from the cylindrical body 5. The cylindrical body 5 and the actuating member 6 are made of synthetic resin and are formed in one by carrying out so called the outsert processing to a cylindrical rotor 7 made of permanent magnet. The rotor 7 is magnetized in two poles. In FIG. 3, the boundary line of two poles (N,S) is shown by a dot-dash line. The actuating member 6 is formed on the extended line of the boundary line and an actuating pin 6a formed at the tip of the actuating member is inserted in the slot 2a penetrating through the slot 1b. This actuating pin 6a has a circle like shape in the cross-section at the root portion, and the tip portion is thinner than the root portion which has an ellipse shape cross-section as is clearly seen by comparing FIG. 2 with FIG. 3.

Next, the constitution about a stator side to the rotator 7 is explained. The stator side consists of two yokes 8 and 9 and two coils 10 and 11. Yokes 8 and 9 have the same shape as shown by dotted portion in FIG. 3, where the yoke 9 is arranged at the state where the yoke 9 is over turned to the yoke 8, and each arc-shaped surface of magnetic pole are faced to the surface of the rotor 7. Coils 10 and 11 are winded on bobbins and a portion of yokes 8 and 9 are inserted in the bobbins from the both sides of the hollow parts of the bobbins. Yokes 8 and 9 are engaged in, at two portions, the shaft 1c which stands on the shutter base plate 1. All of these attachment constitution at the four portions are the same.

Then, explanation is given to the way how the yoke 9 is attached to the shaft 1c. As shown in FIG. 2, the yoke 9 is engaged in the small diameter portion of the shaft 1c. Then a ring-shaped seat 12 is engaged in it, and the attachment plate 3 is placed on the surface of the tip portion of the shaft 1c. Then the screw 4 is inserted into the hole 3a and screwed in a screw hole formed in the shaft 1c. As seen in comparison FIG. 1 with FIG. 3, if it would have been illustrated in detail, at least a part of the shaft 1c must have been hidden by the back side of the coil 10 in FIG. 2. Nevertheless, in order to show intelligibly the attachment constitution, the shaft 1c in a shifted position is shown.

Between the shutter base plate 1 and the attachment plate 3, a brake mechanism other than the actuating mechanism is arranged and these constitution components are attached in the shutter base plate 1. Then, the constitution of the brake mechanism is explained. As shown in FIG. 2, a short shaft 1e is arranged to stand on the shutter base plate 1 and a screw hole is formed in the axial center of the shaft 1e. In this shaft 1e, a brake member 13, the friction plate 14 and the control ring 15 are fitted in order and such members are fixed to stop falling out by screwing the screw 16 into the screw hole in the shaft 1e. The friction plate 14 formed in a ring like shape, as shown in FIG. 4, is slightly bent on the straight line passing through the center of the circle in order that elasticity can be obtained. Accordingly, by changing the shape of the friction plate 14, the friction power to the rotation of the brake member 13 can be adjusted according to the screwed condition of the screw 16.

As seen in FIG. 1, the brake member 13 has two jutting arm portions forming V-shape from the attachment portion to shaft 1e and the shaft 1d that is the rotation axis of the rotor 7 is arranged between these arm portions. The bent portions 13a and 13b are formed at the tip of two arm portions. These bent portions 13a and 13b are inserted into the slot 1b and they are formed in the range narrower than the operation range of the actuating pin 6a. The portions 13a and 13b are formed to be contacted with an end surface in the elongated direction of the slot 1b when they are pressed by the actuating pin 6a.

Next, the constitution of the shutter blade arranged in the blade chamber is explained. The shutter blade of this embodiment consists of two arms 17 and 18 and four blades 19, 20, 21 and 22 which are pivoted in order in the elongated direction of the arms. The arm 17 is rotatably arranged in the shaft portion 1d-1 shown in FIG. 2 and the arm 18 is attached rotatably in the shaft if (refer to FIG. 1) which is formed to stand on the shutter base plate 1. A hole which is well known but not illustrated here is formed in the arm 17, and a portion of the actuating pin 6a which has an ellipse like shape in cross section is fitted into the hole.

Next, the operation of this embodiment is explained. FIG. 1 shows an initial position when the normally-closed system is adopted. That is to say, it shows a state when photographing has not yet started irrespective of opening or closing of the power supply of a camera. In this state, the actuating pin 6a of the actuating member 6 is pressing the bent portion 13a of the brake member 13 against an upper end surface of the slot 1b and four blades of the blades 19 to 22 have closed the opening 1a wherein mutual superposing of blades is a minimum. At this time, another bent portion 13b of the brake member 13 has not been contacted with a lower end surface of the slot 1b but keeps a predetermined distance. And such a state is maintained by the magnetic pulling power generated by the relative position between the side surfaces of two poles of the rotor 7 and the magnetic pole surfaces of two yokes 8 and 9.

In the state shown in FIG. 1, when a power supply is turned on and a release button (switch) is pressed, a light measurement circuit, AF equipment, etc. begin to function as well as conduction of coils 10 and 11 in a predetermined direction is performed. Accordingly, the rotor 7 and the actuating member 6 which are formed in one are rotated to clockwise direction, and the arm 17 of the shutter blade is rotated to clockwise direction by the actuating pin 6a. At this time, the brake member 13 is maintaining a stop state by the friction power of the friction plate 14. In such way, as the arm 17 is rotated to clockwise direction, four blades 19 to 22 of shutter blade move downward, increasing the amount of superposing of adjacent blade and the opening 1a is opened by the upper end portion of the blade 22. The speed of their movements increase rapidly by increase of the rotation speed of the rotor 7 and generation of acceleration.

FIG. 5 shows a termination stage of the process in releasing operation mentioned above. At this stage, the actuating pin 6a makes the brake member 13 rotate in clockwise direction by contacting, pressing and moving the bent portion 13b of the brake member 13. In such rotation, a friction power generated by the friction plate 14 is acted. Accordingly, the releasing movement of the shutter blade is braked, and immediately after that, the bent portion 13b is contacted with lower end surface of the slot 1b and the movement is made to stop. Therefore, four blades 19 to 22 do not bound much after having made the opening 1a full open state as shown in FIG. 6, and can stand still early in superposed state. At this time, it goes without saying that the bent portion 13a is departed from upper end surface portion of the slot 1b and a predetermined space between the both portions is kept by rotation of the brake member 13.

Thus, when the opening 1a is fully opened, the electric charge accumulated in the release operation process is emitted by the signal from an exposure control circuit and accumulation of the new electric charge for the photographing begins. And when a predetermined time elapsed according to the measurement result by the light measurement circuit, conduction of the coils 10 and 11 in reversed direction against the direction mentioned above is carried out by the signal from an exposure control circuit. Accordingly, the rotor 7 is rotated to counterclockwise direction and the actuating pin 6a of the actuating member 6 makes the arm 17 of the shutter blade rotate to counterclockwise direction. By such actions, four blades 19 to 22 of the shutter blade move upwards, decreasing the amount of mutual superposing of adjacent blades and then the opening 1a is made to be closed by the upper end portion of the blades 22.

And then, at the termination stage of the closing operation, the actuating pin 6a contacts, presses and moves the bent portion 13a, thereby it makes the brake member 13 rotate in counterclockwise direction. Accordingly, the closing operation of the shutter blade is braked by the frictional resistance power by existence of the friction plate 14. And immediately after the shutter blade is braked it is stopped by contacting the bent portion 13a to the upper end portion of the slot 1b. Therefore, the shutter blade stands still in the state shown in FIG. 1, without generating a big bound at an early stage after having closed the opening 1a completely. Thus, when the opening 1a is closed, photographing information which was photo-electrically converted by a solid imaging element is transmitted to a memory storage device, and conduction of the coils 10 and 11 are interrupted, thereby one cycle of photographing sequence is completed.

In case of this embodiment, the time for one cycle of this sequence can be very short. That is, if the opening operation of a shutter blade is performed at high speed in case of a small sized shutter unit, the opening 1a is temporarily and partially covered since the amount of bound at the time of stop is so big. Therefore, if photographing would be started in such state, exposure unevenness is generated. Accordingly, photographing must be started after such possibility disappears. According to this embodiment, start time of photographing can be early since the bound is extremely controlled by existence of a brake mechanism.

With respect to closing operation of the shutter blade, there are two cases. In one case, the closing operation is made to start after the exposure time for photographing elapsed, and in another case, exposure for photographing is terminated by the closing operation of the shutter blade. When the closing operation speed of the shutter blade is slow, in the former case the smear phenomenon generated at the time of the transmission to memory storage is remarkable, and in the latter case exposure unevenness becomes remarkable. Then, in order to avoid such problems if a closing operation would be performed at high speed, the bound at the time of stop would be large and re-exposure would be performed. This must be made to delay a timing of starting the transmission to a memory storage. Moreover, by the re-exposure, in the case of the former, the smear phenomenon is made remarkable, and, in the case of the latter, exposure unevenness is made remarkable. However, by existence of a brake mechanism, in the case of this embodiment, the bound is extremely controlled, and there is no possibility of re-exposure, and the transmission start time to memory storage can be early.

Thus, in a focal plane shutter to which the reciprocating operation of the shutter blade is carried out by the reciprocating operation of a motor, according to this embodiment, it is possible to shorten one cycle of a photographing sequence, while controlling the smear phenomenon and exposure unevenness suitably. Accordingly, since the necessary time for starting the next photographing after one photographing has started can be shortened, the case of missing a photographing opportunity decreases as well as a continuous photographing can be also carried out suitably. Furthermore, since the constitution of the brake mechanism for braking both of the forward motion and the return motion of the reciprocating operation of the shutter blade is simple it is advantageous in layout and cost.

The explanation of the operation mentioned above is for the normally-closed system. In case of the operation by the normally-open system, the state shown in the FIG. 6 is an initial state before photographing is started. When a release button is pressed, photographing is started in this state and then it becomes to the state shown in FIG. 1 when the photographing is terminated. Then, after photographed information is transmitted to a memory storage, it returns to the initial state shown in FIG. 6. Since the operation of each member in such sequence is carried according to the above, detailed explanation is omitted. And, it is the same as the case of the normally-closed system that the operation is carried out suitably at short time.

Second Embodiment

Next, the second embodiment according to the present invention is explained using FIGS. 7 and 8. In this embodiment, two shutter blades consisting of so-called first shutter blade and so-called second shutter blade are provided. In this case, the first shutter blade, its actuating mechanism and the brake mechanism are constituted completely same as the shutter blade, the actuating mechanism and the brake mechanism in the first embodiment. Therefore, in FIGS. 7 and 8, the same reference marks used in the first embodiment are also given only to components and positions necessary for explanation of the operation, but the explanation of the constitution is omitted.

On the other hand, for the second shutter blade an actuating mechanism and a brake mechanism for braking operation are provided. However, in this case, the second shutter blade has substantially same construction as the first shutter blade, but it is arranged in the state where it is turned over (rotated by 180 degree) around the axis (x axis of coordinates) to the right and the left direction in FIGS. 7 and 8. Accordingly, reference numerals adding 100 to the reference numerals of components of the first shutter blade are given to components of the second shutter blade, and detailed explanation is omitted. And the constitution of the actuating mechanism and the brake mechanism of the second shutter blade are completely the same as the constitution of the actuating mechanism and the brake mechanism of the first shutter blade. Therefore, explanation of constitution of those mechanisms is omitted and reference numerals adding 100 to the reference numerals used to the actuating mechanism and the brake mechanism of the first shutter blade are given only to components and positions necessary for explanation of operation.

Then, explanation of constitution other than that mentioned above is given. A shutter base plate 101 in this embodiment has an opening 101a for photographing optical path and its size of the vertical direction is larger than that of the opening 1a in the first embodiment. The upper area of the opening 101a also is largely formed so that four blades 119 to 122 of the second shutter blade in superposed state can be accommodated. At the back side of the shutter base plate 101, an intermediate plate 104 is arranged between an auxiliary base member 102 and the shutter base plate 101. A blade chamber of the first shutter blade is constituted between the shutter base plate 101 and the intermediate plate 104. Furthermore, a blade chamber of the second shutter blade is constituted between the intermediate plate 104 and the auxiliary base member 102. Furthermore, openings 102a and 104a having the nearly same shape as the opening 101a are also formed in the auxiliary base member 102 as well as the intermediate plate 104. In the case of this embodiment, the opening 111a restricts the opening for photographing optical path.

As one can see illustrated in FIG. 7, some portions of the shutter base plate 101 and the intermediate plate 104 have been cut out in order to explain plainly superposing relations among the shutter base plate 101, the intermediate plate 104 and the auxiliary base member 102.

In this embodiment, a slot 101b which has substantially the same shape as the slot 1b in the first embodiment is formed as a penetrating hole in the left side area of the opening 101a and another slot 101g is also formed in same way. As seen in the first embodiment, the actuating pin 6a of the actuating member 6, the bent portions 13a and 13b of the brake member 13 are inserted into the slot 101b. Similarly the actuating pin 106a, the bent portions 113a and 113b of the brake member 113 are inserted into the slot 101g.

Next, the operation of this embodiment is explained. This embodiment can be adopted for silver-salt film cameras as well as digital still cameras also since two shutter blades are provided in the embodiment. Moreover, when it is adopted in digital still cameras, it can be operated by the normally-closed system as well as by the normally-open system. However, the operation in the normally-closed system is substantially the same as the operation when it is adopted in silver-salt film cameras. Therefore, the following explanation is given about the case that is operated by the normally-closed system and adopted in digital still cameras. Explanation about the case operated by the normally-open system is given extrinsically as same as in the case of first embodiment.

In addition, since the operation of each shutter blade is the same as the operation of shutter blade in the first embodiment, explanation of superposed contents is given simply.

FIG. 7 shows an initial position in this embodiment. At this state, the actuating pin 6a of actuating member 6 presses the bent portion 13a of the brake member 13 against the upper end portion of the slot 101b, and four blades 19 to 22 of the first shutter blade in spread state makes the opening 101a close. Another the actuating pin 106a of the actuating member 106 presses the bent portion 113a of the brake member 113 against the upper end portion of the slot 101g. And four blades 119 to 122 of the second shutter blade in superposed state are contained in the upper area of the opening 101a. At this state in this embodiment, the boundary line of the magnetic pole of the rotor 107 is parallel with the boundary line of the magnetic pole of the rotor 7. Therefore, the rotor 7 and 107 of the actuating member 6 and 106 are maintained in this state by the relation with two magnetic pole portions of two yokes as same as the case of the first embodiment.

In the state shown in FIG. 7, when the release button is pressed, AF apparatus and others start to function by a light measurement circuit. At first conduction of coils 10 and 11 in a predetermined direction is carried out. Then after a predetermined time on the basis of the light measurement result conduction of the coils 110 and 111 in a predetermined direction are carried out. Then, first, the actuating member 6 is rotated together with the rotor 7 to clockwise direction, and the first shutter blade is operated by the actuating pin 6a. Accordingly, four blades 19 to 22 are moved below, enlarging the amount of superposing of adjacent blades, and the opening 111a is opened by the upper end portion of the shutter blade 22. After a predetermined time, the actuating member 106 is rotated to clockwise direction together with the rotor 107, and the second shutter blade is operated by the actuating pin 106a. Therefore, four blades 119 to 122 are moved below, decreasing the amount of superposing of adjacent blades, and the opening 101a is closed by the lower end portion of the shutter blade 122.

Therefore, after the second shutter blade starts the operation, an imaging surface of a solid imaging element is exposed from the upper part to the lower part by a slit which is formed between the shutter blade 22 of the first shutter blade and the shutter blade 122 of the second shutter blade. And at termination stage of these operations, firstly, braking is carried out by such way that the actuating pin 6a contacts and presses and then moves the bent portion 13b of the brake member 13. Immediately after that, the operation of the first shutter blade is stopped by contacting the bent portion 13b with the lower end portion of the slot 101b. Then braking is carried out by the pin 106a contacting, pressing and moving the bent portion 113b of the brake member 113. Then, immediately after that, the second shutter blade is also stopped by the bent portion 113b contacting the lower end portion of the slot 101g.

Accordingly, four blades 19 to 22 of the first shutter blade and four blades 119 to 122 of the second shutter blade also become to stand still early without generating big bound. And four blades 19 to 22 of the first shutter blade become in superposed state, and are contained in the lower area of the opening 101a. Meanwhile, four blades 119 to 122 of the second shutter blade become in spread state and close the opening 101a completely. FIG. 8 shows the state. At this state, imaging information obtained by photoelectric conversion with a solid imaging element is transmitted to a memory storage, and conduction of coils 10 and 11 as well as coils 110 and 111 are interrupted, thereby one cycle of photographing sequence is completed.

In this embodiment, the next photographing is possible from the state shown in FIG. 8, immediately after such one cycle of photographing is completed, without cocking actuation. That is to say, in the state of FIG. 8, when a release button is pressed, firstly conduction of coils 110 and 111 in reversed direction to the case mentioned above is carried out. And after the predetermined time on the basis of the light measurement result, conduction of coils 10 and 11 is also carried out to reversed direction as mentioned above. For this purpose, firstly, the actuating member 106 is rotated to counterclockwise direction together with the rotor 107, four blades 119 to 122 of the second shutter blade are moved upwards by the actuating pin 106a, and then the opening 111a is opened by the lower end portion of the shutter blade 122. After a predetermined time, the actuating member 6 is rotated to counterclockwise direction together with the rotor 7 and then four blades 19 to 22 of the first shutter blade are moved upwards by the actuating pin 6a, and then the upper end portion of the shutter blade 22 closes the opening 101a.

Therefore, after the first shutter blade starts the operation, the imaging surface of the solid imaging element is exposed from the upper part towards the lower part by a slit which is formed between the blade 22 of the first shutter blade and the blade 122 of the second shutter blade. And at the termination stage of those operations, firstly braking is carried out by such manner that the actuating pin 106a contacts, presses and moves the bent portion 113a of the brake member 113. Immediately after that, the operation of the second shutter blade is stopped by contacting the bent portion 113a with the upper end portion of the slot 101g. Then braking is carried out by the pin 6a which contacts, presses and moves the bent portion 13a of the brake member 13. Then, immediately after that, the first shutter blade is also stopped by the bent portion 13a contacting the upper end portion of the slot 101b.

Accordingly, four blades 19 to 22 of the first shutter blade and four blades 119 to 122 of the second shutter blade also become to stand still early without generating big bound. And four blades 119 to 122 of the second shutter blade become in superposed state, and are contained in the upper area of the opening 101a. And also four blades 19 to 22 of the first shutter blade become in spread state, and closes completely the opening 101a. At the state shown in FIG. 7, the imaging information obtained by photoelectric conversion with a solid imaging element is transmitted to a memory storage, and conduction of coils 10 and 11 as well as coils 110 and 111 are interrupted, and one cycle of photographing sequence is completed. Thus, according to this embodiment, successive one-way operation is only required, without reciprocating operation of the first shutter blade and the second shutter blade in one cycle of a photographing sequence. Therefore, according to this embodiment, necessary time for starting the next photographing can be much shorten and consumption of a battery can be much less than the case where the forward motion is used for an exposure operation and the return motion is used for a cocking actuation.

Moreover, according to this embodiment, suppressing of bound and early reaching stand-still state can be achieved since a suitable braking is carried out by each brake mechanism respectively, even if each of the shutter blade is actuated to any direction at high speed. Thus, generating of exposure unevenness and the smear phenomenon can be prevented even if an imaging information is transmitted to a to memory storage device immediately after closing the opening. Therefore, it possible to shorten time for starting the next photographing so much. Moreover, the brake mechanism of this embodiment can be suitably arranged, in case that two motors as actuating source are provided since the constitution is very simple. And an assembly work can also easily carried out and a shutter unit can be assembled compactly. And such advantages are applicable in case where the actuation in the forward direction namely the forward motion is for exposure actuation and the return motion is for cocking actuation. Moreover, this embodiment can be adopted also in silver-salt film cameras. In such case, it is possible to shorten a necessary time for starting of winding-up of a film, and thus it is possible also to have early timing for starting the next photographing.

The above-mentioned operation is explained about the case of the normally-closed system. In case that this embodiment is operated by the normally-open system, in FIG. 7 the first shutter blade is contained in the lower part area of the opening 111a which is fully opened. Therefore, when a release button is pressed in that case, the first shutter blade or the second shutter blade is actuated and once the opening 111a is closed, then the above exposure operations are carried out.

That is, when the first shutter blade is closed, photographing is operated in order of actuating the first shutter blade and the second shutter blade. When an exposure operation is completed, photographing information is transmitted to memory storage. Then, only the second shutter blade is actuated to return in an initial state by return motion when the second shutter blade is closed. Exposure operation is made in order of actuation the second shutter blade and the first shutter blade. After photographing information is transmitted to memory storage. Then, only the first shutter blade is actuated to return in an initial state by the return motion. As described above, in case of the normally-open system, its operation is more complicated than the case of the normally-closed system. However, according to the constitution of this embodiment of the present invention, as the more complicated the constitution is, the more suitably shortening the time necessary for one cycle of a photographing sequence can be achieved.

In each embodiment mentioned above, explanation has been made with respect to the case where a rotor made from permanent magnet and an actuating member are manufactured in one by ejection fabrication processing technology. However, according to the present invention it is possible to unify both in one after having manufactured them separately. Also, the actuating member can be actuated with reciprocating motion by the rotor instead of unifying both in one. Furthermore, according to the present invention it is possible to use a current control motor having different constitution or step motor instead of the current control type motor used in this embodiment.

In each embodiment mentioned above, the actuating pin of the actuating member is constituted to contact, press and move the brake member. However, it is also possible to constitute to arrange a pressed portion for exclusive use on the actuating member whereby the pressed portion is made to contact, press and move the brake member. In each embodiment mentioned above, the brake component has V-type shape with two arm portions, and the bent portion formed near the tip of the arm and inserted into the slot on the shutter base plate is constituted as a pressed portion to be pressed and moved by the actuating member. However, without arranging the bent portion, instead, the end portion of the arm portion can be used as the pressed portion to be pressed and moved. Accordingly, in such case, both edges in the elongated direction of the slot formed in the shutter base plate are not used as a stopper. Instead, in this case it is necessary to arrange some other stopper on the shutter base plate. And, in either case where the bent portion to be inserted into the slot of the shutter plate is formed or not, the shape of the brake member can be a triangle shape which is formed by connecting tip portions of two arm portions.

In each embodiment mentioned above, the friction plate for braking the rotation of the brake member is mounted on the attachment shaft of the brake member. However, the brake means according to the present invention is not limited to the friction plate of such constitution. Any brake means can be arranged so long as it enables to brake the rotation of the brake member by friction power. For example, the brake means can be arranged on the surface of the shutter base plate at a separate position in the radial direction from the attachment shaft of the brake member Furthermore, in this case, if the shutter base plate is made of synthetic resin, the brake means can be formed at the time of forming processing as a resilient portion to be used for contact with the brake member, instead of forming separately the brake means by different member.

What is claimed is:

1. A focal plane shutter for cameras comprising:

a shutter base plate having a first opening for a photographing path, an auxiliary base member which has a second opening to regulate an opening for the photographing optical path by at least one of the first opening and the shutter base plate, and constitutes a blade chamber between the shutter base plate and the auxiliary base member, a shutter blade which is constituted by a plurality of arms arranged in the blade chamber and pivoted on the shutter base plate, and at least one blade pivoted respectively on each arm, an actuating member which is rotatably arranged on the shutter plate and is connected with the shutter blade, and actuates the shutter blade by its reciprocating rotation between a fully opened position and a completely closed position of the opening for the photographing optical path, an electromagnetic actuating device which is arranged on the shutter base plate and carries out the reciprocating rotation of the actuating member, a brake member which is rotatably arranged on the shutter base plate and has two pressed portions which are contacted, pressed and moved by the actuating member at each termination stage of the reciprocating rotation of the actuating member, and a brake means which brakes rotation of the brake member by friction power generated by contacting under pressure with the brake member.

2. A focal plane shutter for cameras according to claim 1, wherein two blade chambers are formed by partitioning space between the shutter base plate and the auxiliary base member, and a shutter blade is arranged in one of the two blade chambers and another shutter blade is arranged in the other of the two blade chamber, and wherein components of said another shutter blade, respectively corresponding to the actuating member, the electromagnetic actuating device, the brake member, and the brake means, are individually arranged.

3. A focal plane shutter for cameras according to claim 1, wherein the electromagnetic actuating device has a rotor made of permanent magnet, the actuating member has a driving pin connected to the shutter blade, and the rotor is constituted in one with the actuating member.

4. A focal plane shutter for cameras according to claim 3, wherein a rotation shaft of the rotor is pivoted perpendicularly to the shutter base plate, the brake member has V-shape which is formed by two arm portions extending from attachment portion to the shutter base plate, the rotation shaft is arranged between the arm portions, the pressed portions are formed near the tip of the two arm portions, the brake means is a friction plate mounted in piles on the attachment portion and the driving pin of the actuating member is constituted to contact, press and move the pressed portions.

5. A focal plane shutter for cameras according to claim 2, wherein the electromagnetic actuating device has a rotor made of permanent magnet, the actuating member has a driving pin connected to the shutter blade, and the rotor is constituted in one with the actuating member.

6. A focal plane shutter for cameras according to claim 5, wherein a rotation shaft of the rotor is pivoted perpendicularly to the shutter base plate, the brake member has V-shape which is formed by two arm portions extending from attachment portion to the shutter base plate, the rotation shaft is arranged between the arm portions, the pressed portions are formed near the tip of the two arm portions, the brake means is a friction plate mounted in piles on the attachment portion and the driving pin of the actuating member is constituted to contact, press and move the pressed portions.

* * * * *